(12) United States Patent
Chapman, II et al.

(10) Patent No.: US 9,124,626 B2
(45) Date of Patent: Sep. 1, 2015

(54) FIREWALL BASED BOTNET DETECTION

(71) Applicant: International Business Machines Corporation, Armonk, NY (US)

(72) Inventors: Daniel E. Chapman, II, Romulus, MI (US); Gary I. Givental, Royal Oak, MI (US); John D. Kuhn, Clarkson, MI (US); Michael J. Suzio, Royal Oak, MI (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/897,519

(22) Filed: May 20, 2013

(65) Prior Publication Data

US 2014/0344912 A1    Nov. 20, 2014

(51) Int. Cl.
H04L 29/06    (2006.01)

(52) U.S. Cl.
CPC ........ H04L 63/1441 (2013.01); H04L 63/1416 (2013.01); *H04L 2463/144* (2013.01)

(58) Field of Classification Search
CPC . H04L 63/14; H04L 63/1408; H04L 63/1416; H04L 63/1425; H04L 63/1433
USPC ............................................... 726/22, 23, 25
See application file for complete search history.

(56) References Cited

U.S. PATENT DOCUMENTS

| 8,578,493 | B1 * | 11/2013 | Cowan et al. ................. 726/23 |
| 2004/0230797 | A1 | 11/2004 | Ofek et al. | |
| 2011/0016509 | A1 | 1/2011 | Huang et al. | |

FOREIGN PATENT DOCUMENTS

EP    1050788 A2    11/2000

OTHER PUBLICATIONS

Arshad, et al.; "An Anomaly-based Botnet Detection Approach for Identifying Stealthy Botnets"; 2011 International Conference on computer Applications and Industrial Electornics (ICCAIE 2011); pp. 564-569; Copyright 2011 IEEE.
Anteniese, et al.; "Remote Data Checking Using Provable Data Possession"; ACM Transactions on Information and System Security; vol. 14; No. 1; Article 12; Publication Date May 2011.
"Bot Detection"; Bot Detection—Malicious Software Detection—Bontnet Screening; Copyright 2013 eSoft; Printed Feb. 11, 2013; <http://www.esoft.com/entwork-security-appliances/add-ons/bot-detection/>.

(Continued)

*Primary Examiner* — Edward Zee
(74) *Attorney, Agent, or Firm* — William H. Hartwell; Ian A. McKee

(57) ABSTRACT

A computer detects malicious intrusions (or bots) into a computer. The computer receives firewall log data that includes communication records containing the source and destination of the communication, as well as, the time of the communication. The source or destination of the communication may be on a list of suspicious servers known to contain malicious software. The computer identifies a sequence of communications between a common source address and a common destination address. The computer further identifies substantially fixed intervals between the communications, and generates an alert indicating a suspected bot intrusion. The computer also identifies from the sequence of communication, patterns in the communication intervals, similarly generating an alert indicating a suspected bot intrusion.

20 Claims, 3 Drawing Sheets

(56) References Cited

OTHER PUBLICATIONS

"Metaflows"; Metaflows—Advanced Behavioral Malware Detection, Network Security . . . ; Copyright 2012 MetaFlows Inc.; Printed Feb. 11, 2013; <http://www.metaflows.com/>.

Wallach et al.; Efficient Tamper-Evident Data Structures for Untrusted Servers; Rice University Thesis; Dec. 2009.

Goebel, et al. "Rishi: Identify Bot Contaminated Hosts by IRC Nickname Evaluation". pp. 1-12. HotBots '07 First Workshop on Hot Topics in Understanding Botnets. Apr. 10, 2007, Cambridge, MA. USENIX.

Waldecker, "A Review on IRC Botnet Detection and Defence". (2011) In: Kaspersky IT Security for the Next Generation European Cup 2011, Erfurt, Germany, S. pp. 1-9.

* cited by examiner

FIREWALL BASED BOTNET DETECTION

FIELD OF THE INVENTION

The present invention relates generally to Internet security and more specifically to the detection of computer attacks by an Internet "bot" (which is short for a program robot) or a network of related bots called a "botnet".

BACKGROUND OF THE INVENTION

The Internet is a global system of interconnected computer networks that use the standard Internet protocol suite (TCP/IP) to serve billions of users worldwide. It is a network of networks that consists of millions of private, public, academic, business, and government networks, of local to global scope, that are linked by a broad array of electronic, wireless and optical networking technologies.

Computer and network systems are subject to a variety of attacks such as viruses, worms, trojans, unauthorized users, an individual bot or a botnet. A botnet is a collection of internet-connected programs communicating with other similar programs in order to perform tasks. These can be as mundane as keeping control of an Internet Relay Chat (IRC) channel, or malicious, as in the case of sending spam email, participating in distributed denial of service (DDoS) attacks, or other malicious activity. Typically a botnet refers to any group of computers, often referred to as zombie computers or bots, that have been recruited by executing malicious software. A botnet's originator, typically known as a "botherder" or "botmaster," can control the group remotely, usually through an IRC channel, and often for criminal purposes. The botnet originator can communicate through the IRC channel via a server, known as the command-and-control (C&C) server. The means for communication in a centralized architecture is either IRC protocol or Hypertext Transfer Protocol (HTTP). The IRC protocol allows the botmaster to have real time communication with the bots. In the HTTP protocol, the botmaster does not communicate directly with the bots but rather, the bots periodically contact the C&C server to obtain their instructions. Some newer botnets communicate using a decentralized architecture by employing peer-to-peer (P2P) communication, with command-and-control embedded into the botnet rather than relying on C&C servers, thus avoiding any single point of failure.

A firewall is a set of related programs used to help keep a network secure. Its primary objective is to monitor and control the incoming and outgoing network traffic by analyzing the data packets and determining whether each packet should be allowed through or not, based on a predetermined rule set. Features of a firewall may include logging, reporting, and a graphical user interface for controlling the firewall.

SUMMARY

Embodiments of the present invention provide for a program product, system, and method for detecting malicious intrusions (or bots) into a computer. The computer receives firewall log data that includes communication records containing the source and destination of the communication as well as the time of the communication. The source or destination of the communication may be on a list of suspicious servers known to contain malicious software. The computer identifies a sequence of communications between a common source address and a common destination address. The computer further identifies substantially fixed intervals between the communications, and generates an alert indicating a suspected bot intrusion. The computer also identifies from the sequence of communication, patterns in the communication intervals, similarly generating an alert indicating a suspected bot intrusion.

DETAILED DESCRIPTION

Figure 1:
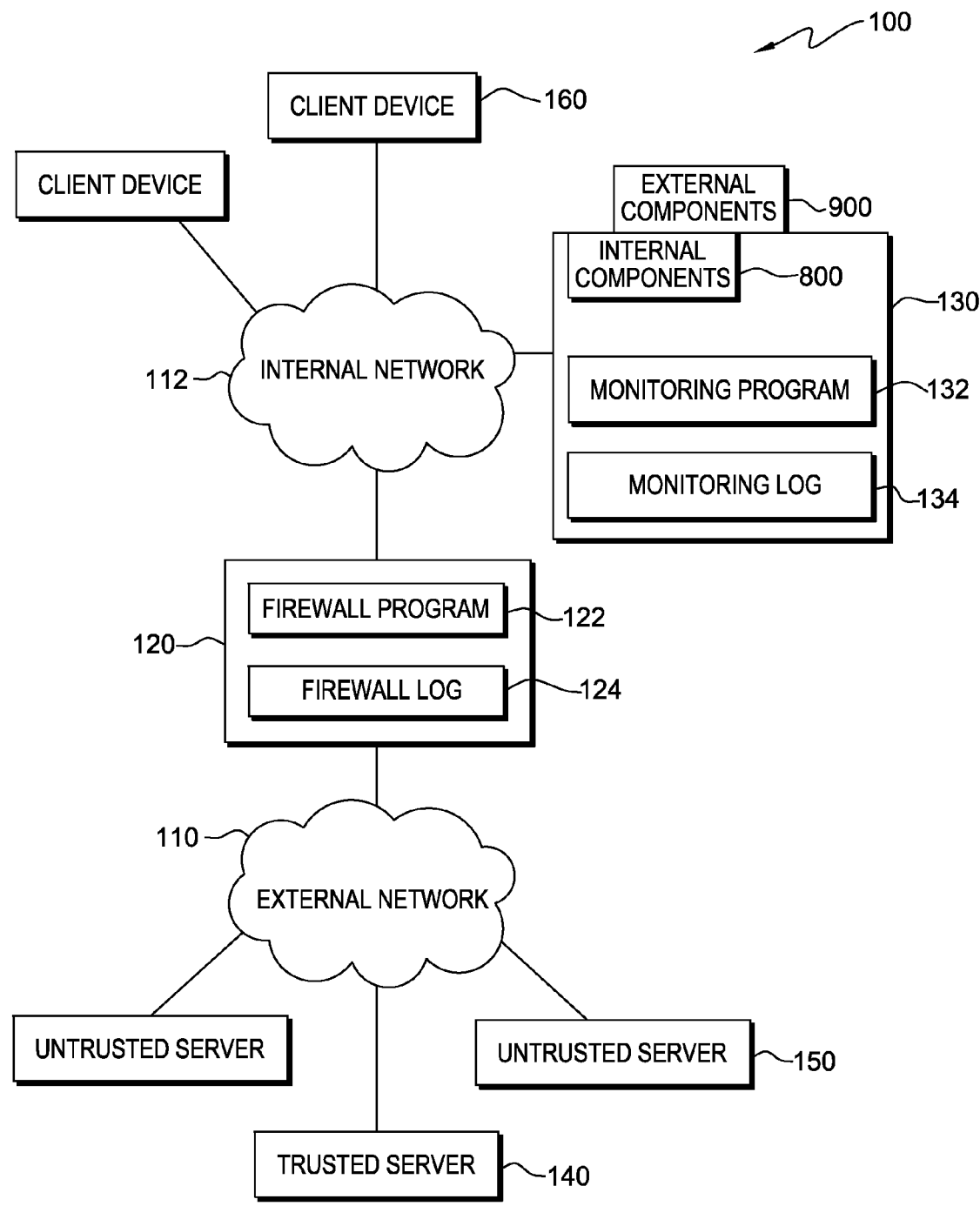
FIG. 1 is a block diagram illustrating a botnet detection system in accordance with an embodiment of the present invention.

The present invention will now be described in detail with reference to the Figures. FIG. 1 is a block diagram illustrating botnet detection system 100, in accordance with one embodiment of the present invention. In an exemplary embodiment, botnet detection system 100 includes computing device 120, client device 160, computing device 130, trusted server 140, and untrusted server 150, all interconnected via internal network 112 and external network 110. Computing device 120, trusted server 140 and untrusted server 150 are all interconnected via external network 110, while computing device 120, client device 160 and computing device 130 are all interconnected via internal network 112.

Computing device 120 includes firewall program 122 and firewall log 124. In an exemplary embodiment, firewall program 122 is a program that monitors and controls the incoming and outgoing network communication between external network 110 and internal network 112 in order to protect internal network 112 from malicious activity. The network communication is typically in the form of data packets, which include at least a header and a payload. The header contains information including the source and destination of the communication, and the size of the data packet. Firewall program 122 saves a record of each network communication in firewall log 124. Each record of firewall log 124 includes at least the source of a communication, the destination of a communication, and the time a communication was observed by firewall program 122.

Computing device 130, connected to internal network 112, includes monitoring program 132 and monitoring log 134. Monitoring program 132 is capable of accessing firewall log 124 and operates to detect botnets as discussed in detail below.

External network 110 may include one or more networks of any kind that provide communication links between various devices and computers. External network 110 may include connections, such as wired communication links, wireless communication links, or fiber optic cables. In one example, external network 110 is the Internet, a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. External network 110 may also be implemented as a number of different types of networks, such as for example, an intranet, a local area network (LAN), or a wide area network (WAN). In the depicted embodiment, trusted server 140 and untrusted server 150 are connected to external network 110.

Internal network 112 can be, for example, a local area network (LAN), a wide area network (WAN) such as the Internet, or a combination of the two, and can include wired, wireless, or fiber optic connections. Internal network 112 is separated from external network 110 by firewall program 122 of computing device 120. In the depicted embodiment, client device 160 and computing device 130 are connected to internal network 112. In general, external network 110 and internal network 112 can be any combination of connections and protocols that will support communications amongst client device 160, computing device 130, computing device 120, trusted server 140, and untrusted server 150.

In various embodiments of the present invention, each one of computing device 120 and computing device 130 can include a laptop, tablet, or netbook personal computer (PC), a desktop computer, a smart phone, a mainframe computer, or a networked server computer. Further, each one of computing device 120 and computing device 130 can include computing systems utilizing clustered computers and components to act as single pools of seamless resources, or can represent or exist within one or more cloud computing datacenters. Computing device 130 can be any programmable electronic device, which may include internal components 800 and external components 900 as described in further detail with respect to FIG. 3, and which is capable of executing monitoring program 132, creating monitoring log 134, and accessing firewall log 124.

Monitoring program 132 operates to detect an individual bot or a plurality of bots of a botnet connected to, or within, internal network 112. A botnet is a group of computers controlled by a botnet originator, usually to achieve a malicious purpose. The creation of a botnet begins with the download of a software program called a bot by an unsuspecting user to the user's computer. This can happen when the user clicks an infected e-mail attachment or Trojan Horse, or downloads infected files from peer to peer ("P2P") networks or from malicious websites. Once the bot has been installed on the unsuspecting user's computing device (thereby creating an "infected device"), communication will be established between the bot and a command and control ("C&C") server, or other bots in the case of P2P communication. This communication allows the botnet originator (the "botmaster") to send commands to the bot and allows the bot to send the status about the infected device to the botmaster. Typically this communication uses public Internet Chat Relay (IRC) servers, but can also use Hypertext Transfer Protocol (HTTP), simple mail transfer protocol (SMTP), transmission control protocol (TCP), or user datagram protocol (UDP) communication.

Monitoring program 132 analyzes the records in firewall log 124 to identify communication between a C&C server and a bot within a botnet. For example, monitoring program 132 can identify communication from a C&C server to a bot, or from a bot to a C&C server, or both. Communication between a C&C server and an infected device will often occur periodically, i.e. at a fixed interval such as every minute, or according to a more complex but repeating pattern of intervals. One example of a more complex pattern is alternating intervals of one minute and one hour. A further example of a more complex pattern is the insertion of one or more communications between the fixed interval communications. As such, the fixed interval is not necessarily between sequential communications or between sequential intervals.

Monitoring program 132 examines the communication records stored in firewall log 124 to look for such similar or patterned communication between, for example, client device 160 and untrusted server 150. In particular, monitoring program 132 maintains a collection of monitoring log records in monitoring log 134, where each monitoring log record includes a collection of timestamp records for a common source address and destination address. Client device 160 can be, for instance, a desktop computing workstation, laptop, or mobile device within internal network 112. Untrusted server 150 may be categorized as untrusted based on, but not limited to, factors such as its inclusion on a list of suspect servers, previous experience of malicious activity, or non-inclusion on a list of trusted servers. In one embodiment, monitoring program 132 compares the source address and the destination address to a list of suspect servers. Conversely, trusted server 140 may be categorized as trusted based on, but not limited to, factors such as its inclusion on a list of trusted servers, no history of malicious activity, or non-inclusion on a list of untrusted servers. If similar or patterned communication is detected, an alert is generated as to the possible existence of a botnet.

Figure 2:
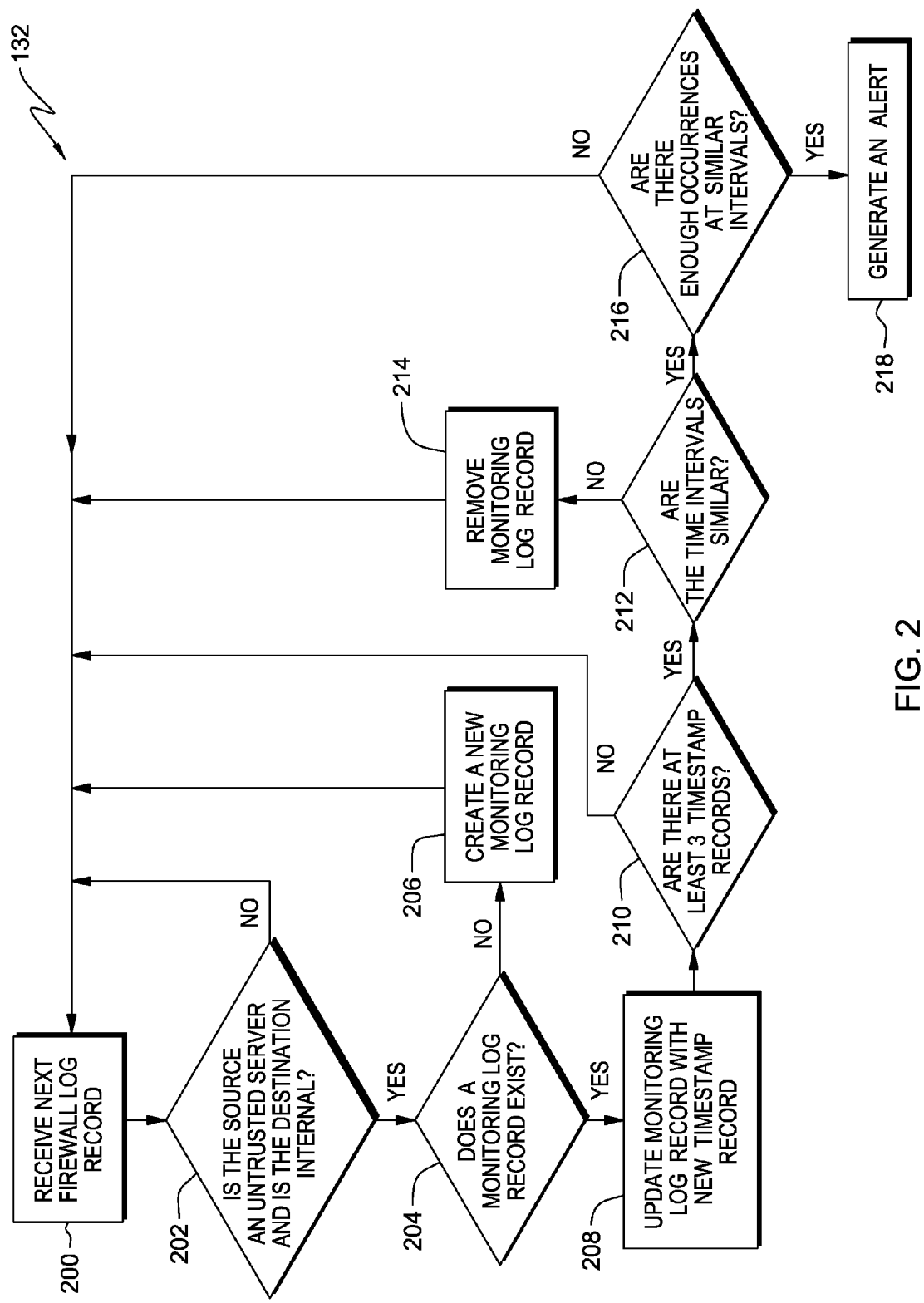
FIG. 2 is a flowchart showing the operational steps of a monitoring program within the botnet detection system of FIG. 1, in accordance with an embodiment of the present invention

FIG. 2 is a flowchart showing the operational steps of monitoring program 132 within botnet detection system 100 of FIG. 1, in accordance with an embodiment of the present invention. After discussing the operational steps of monitoring program 132 in the context of steps 200 through 218 generally, a specific example of monitoring program 132 in operation will follow. Monitoring program 132 receives a record from firewall log 124 (step 200). In one embodiment, the log record identifies one or more prior communications through the firewall, including the source IP address, destination IP address, destination port, date and time of each communication. In an exemplary embodiment, a single monitoring log record is a collection of identities of communications with a common source IP address and destination IP address, each with its own timestamp. Monitoring program 132 then checks the firewall log record to determine if the source of a communication is an untrusted server and the destination is internal (decision 202). If the source of a communication is a trusted server, such as trusted server 140, or the destination of a communication is not within internal network 112 (decision 202, "NO" branch), the firewall log record requires no further evaluation by monitoring program 132, and monitoring program 132 returns to step 200 to receive the next firewall log record. If the source of a communication is from an untrusted server, such as untrusted server 150, and the destination is within internal network 112, such as client device 160, (decision 202, "YES" branch) monitoring program 132 determines if a monitoring log record exists in monitoring log 134 for the particular source address and destination address of the communication of the received firewall log record (decision 204). The monitoring log record is also used to evaluate the time intervals between communications that take place between the common source address and destination address. As such, a monitoring log record includes a source address, a destination address, and potentially numerous timestamp records. In one embodiment, the monitoring log record includes communication that occurs in both directions. As such, the destination of a first communication is the source of a second communication, and the source of the first communication is the destination of the second communication. In a further embodiment, a state machine is used in place of the monitoring log record. Monitoring program 132 can create a monitoring log record for each unique pair of source address and destination address that have been included in a received firewall log record. If the monitoring log record does not exist for the current address pair of the communication (e.g., because no prior communication had occurred between the current address pair, etc.) (decision 204, "NO" branch), monitoring program 132 creates a new monitoring log record using the current firewall log record (step 206). Monitoring program 132 then returns to step 200 to receive the next firewall log record. If the monitoring log record does exist for the current address pair (decision 204, "YES" branch), then the monitoring log record is updated with the new timestamp record from the current firewall log record (step 208).

Monitoring program 132 then determines if at least three timestamp records are present in the monitoring log record (decision 210). If at least three timestamp records are not present in the monitoring log record (decision 210, "NO" branch), then monitoring program 132 returns to step 200 to receive the next firewall log record. If at least three timestamp records are present in the monitoring log record (decision 210, "YES" branch), then monitoring program 132 determines if the time intervals are similar by checking the intervals between the timestamp records and calculating the difference between each pair of the timestamp records (decision 212). As such, monitoring program 132 determines whether two or more time intervals of the monitoring log record are similar. In determining that the time intervals are similar, in one embodiment monitoring program 132 does not require that the time intervals be precisely the same. In particular, monitoring program 132 may allow a level of variability to exist between the time intervals by, for example, requiring that the differences between the lengths of the intervals not exceed a threshold. For example, the threshold is a percentage of the interval, for instance, 10%. In a further example, the threshold is a fixed value, for instance, 5 minutes. Increasing the variability allowed by monitoring program 132 may increase the number of false positive results generated. A false positive result occurs when a legitimate communication is miscategorized as a communication to a botnet. Decreasing the variability allowed by monitoring program 132 may increase the number of false negative results generated. A false negative result is when a botnet communication is not identified, leaving internal network 112 vulnerable to malicious activity. The variability can also be based on recent statistical data for known bots and botnets that is collected and indicates how periodic, on the average, are communications between C&C servers and their bots.

If monitoring program 132 determines that the time intervals are not sufficiently similar, (decision 212, "NO" branch), then monitoring program 132 removes the monitoring log record from monitoring log 134 (step 214) and returns to step 200 to receive the next firewall log record. As such, in some circumstances monitoring program 132 may remove a given monitoring log record if only its first two intervals are not similar. Monitoring program 132 thus takes a conservative approach to detecting botnet communication at similar intervals, and avoids the complexity of detecting botnet communication according to a more complex pattern of intervals. In another embodiment, monitoring program 132 can defer removal of the monitoring log record and can attempt to detect a more complex pattern of intervals, as discussed below.

If monitoring program 132 determines that the time intervals are sufficiently similar (decision 212, "YES" branch), monitoring program 132 then determines if there are enough occurrences at similar intervals (decision 216). Factors that determine if enough occurrences exist include, but are not limited to; the number of timestamp records, the magnitude of the time intervals, the variability of the time intervals, the source address of the communication, and the destination address of the communication. For example, in one embodiment determining if enough occurrences exist includes determining that there have been at least two similar intervals. If monitoring program 132 determines that there are not enough occurrences at similar intervals (decision 216, "NO" branch), then monitoring program 132 returns to step 200 to receive the next firewall log record. If monitoring program 132 determines that there are enough occurrences at similar intervals (decision 216, "YES" branch), then monitoring program 132 generates an alert (step 218). In an exemplary embodiment, an alert is an email sent to a system analyst or other responsible person indicating the detection of a suspicious communication pattern.

Having discussed the operational steps of monitoring program 132 in the context of steps 200 through 218 generally above, a specific example of monitoring program 132 in operation follows here. For example, monitoring program 132 receives a first firewall log record from firewall log 124 for a communication between untrusted server 150 and client device 160 at 13:58 on Feb. 25, 2013. Monitoring program 132 determines that untrusted server 150 is an untrusted server and that client device 160 is a client device of internal network 112 (step 202). Monitoring program 132 determines that a monitoring log record does not exist in monitoring log 134 for the pairing of untrusted server 150 and client device 160 (step 204), and creates a monitoring log record in monitoring log 134 for untrusted server 150 and client device 160, such that the monitoring log record includes 13:58 on Feb. 25, 2013 as the first timestamp record (step 206) and returns to receive the next firewall log record.

Monitoring program 132 receives a second firewall log record from firewall log 124 for another communication between untrusted server 150 and client device 160 at 15:00 on Feb. 25, 2013 (a number of additional firewall log records for communications between different pairs of devices may have been separately received by monitoring program 132 after receiving the first firewall log record of the current example, but prior to receiving this second firewall log record). Monitoring program 132 determines that untrusted server 150 is an untrusted server and that client device 160 is a client device of internal network 112 (step 202). Monitoring program 132 determines that a monitoring log record exists in monitoring log 134 for the pairing of untrusted server 150 and client device 160 (step 204), and updates the monitoring log record with the new timestamp record (step 208). Monitoring program 132 determines that there are not at least three timestamp records in the monitoring log record (step 210) and returns to receive the next firewall log record.

Monitoring program 132 receives a third firewall log record from firewall log 124 for a communication between untrusted server 150 and client device 160 at 15:58 on Feb. 25, 2013. Monitoring program 132 determines that untrusted server 150 is an untrusted server and that client device 160 is a client device of internal network 112 (step 202). Monitoring program 132 determines that a monitoring log record exists in monitoring log 134 for the pairing of untrusted server 150 and client device 160 (step 204), and updates the monitoring log record with the new timestamp record (step 208). Monitoring program 132 determines that there are at least three timestamp records in the monitoring log record (step 210) and calculates the time intervals as 62 minutes and 58 minutes, respectively, and determines that the intervals are similar (step 212). Further, the monitoring program 132 determines that there are not enough occurrences at similar intervals, given a variability or four minutes and only two intervals, to create an alert (step 216) and returns to receive the next firewall log record.

Monitoring program 132 receives a fourth firewall log record from firewall log 124 between untrusted server 150 and client device 160 at 16:58 on Feb. 25, 2013. After completing steps 202, 204, 208 and 210 as described above, monitoring program 132 calculates the time intervals as 62 minutes, 58 minutes, and 60 minutes, respectively, and determines that the intervals are similar (step 212). Further, the monitoring program 132 determines that there are enough occurrences at similar intervals, given a variability or four minutes and three intervals (step 216). Monitoring program 132 creates an alert (step 218).

Having discussed the operational steps of monitoring program 132 in the context of steps 200 through 218 generally above, and having discussed a specific example of monitoring program 132 in operation above, a further embodiment of the present invention will now be discussed. In a further embodiment, monitoring program 132 detects botnet communication according to a more complex pattern of intervals. A C&C server may attempt to avoid detection by altering the time intervals for communication with a bot by using a repeating pattern. For example, the C&C server may communicate with a bot in a pattern of alternating time intervals (i.e., one hour, then four hours, then one hour, then four hours). Further, the C&C server may communicate with a bot using incremental time intervals (i.e., one hour, then two hours, then three hours, then two hours, then one hour). The presented patterns are illustrative examples and are not meant to be limiting. Monitoring program 132 can detect such patterns by allowing a number of non-similar time intervals at step 212 prior to removing the monitoring log at step 214. The number of allowable non-similar intervals is set by the user based on factors that may include, but are not limited to, volume of network traffic, available memory, and sophistication of C&C communication. Repeating patterns can be further detected by checking for similarity in non-adjacent time intervals at step 212.

Figure 3:
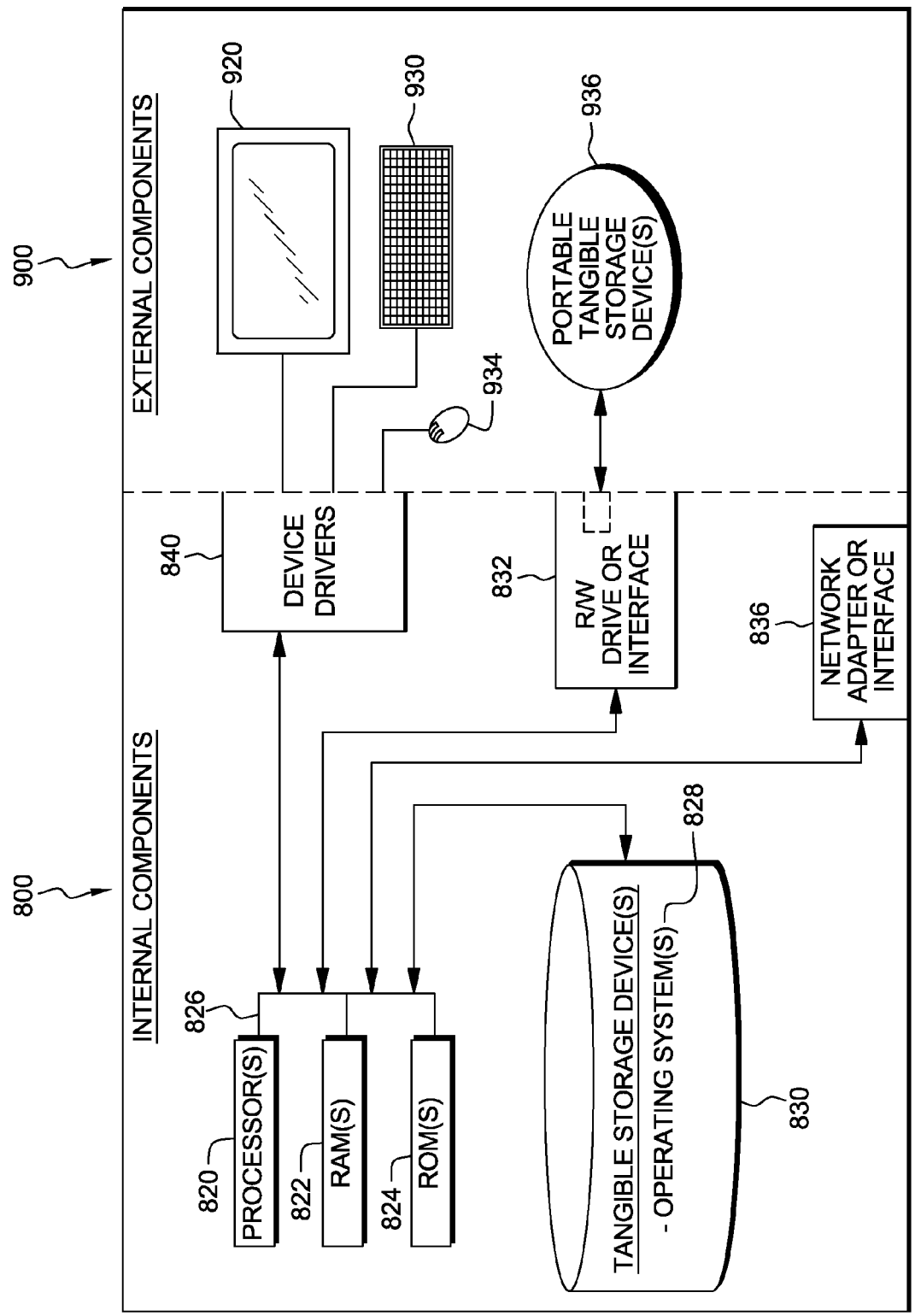
FIG. 3 is a block diagram of internal and external components of a computing device of FIG. 1 in accordance with an embodiment of the present invention.

FIG. 3 is a block diagram of internal and external components of computing device 130 of FIG. 1 in accordance with an embodiment of the present invention. In particular, computing/processing device 130 includes respective sets of internal components 800 and external components 900. Each of the sets of internal components 800 includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and monitoring program 132 are stored on one or more of the respective computer-readable tangible storage devices 830 for execution by one or more of the respective processors 820 via one or more of the respective RAMs 822 (which typically include cache memory). In the illustrated embodiment, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store but does not transmit a computer program and digital information.

Each set of internal components 800 also includes a R/W drive or interface 832 to read from and write to one or more portable computer-readable tangible storage devices 936 that can store but do not transmit a computer program, such as a CD-ROM, DVD, memory stick, magnetic tape, magnetic disk, optical disk or semiconductor storage device. Monitoring program 132 can be stored on one or more of the respective portable computer-readable tangible storage devices 936, read via the respective R/W drive or interface 832 and loaded into the respective hard drive or semiconductor storage device 830.

Each set of internal components 800 also includes a network adapter or interface 836 such as a TCP/IP adapter card or wireless communication adapter (such as a 4G wireless communication adapter using OFDMA technology). The program 132 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

Each of the sets of external components 900 includes a display screen 920, a keyboard or keypad 930, and a computer mouse or touchpad 934. Each of the sets of internal components 800 also includes device drivers 840 to interface to display screen 920 for imaging, to keyboard or keypad 930, to computer mouse or touchpad 934, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

Based on the foregoing, a computer system, method and program product have been disclosed for a method to analyzing internet communication using log data. However, numerous modifications and substitutions can be made without deviating from the scope of the present invention. Therefore, the present invention has been disclosed by way of example and not limitation.

What is claimed is:

1. A method for detecting malicious intrusions into a computer, the method comprising:
   identifying, by one or more processors, a sequence of communications between a common source address and a common destination address through a firewall for the computer, and respective times of the communications;
   determining, by one or more processors, that at least some of the communications occur at substantially fixed intervals, wherein the substantially fixed intervals are non-sequential intervals between non-sequential communications; and
   based at least in part on the determination, generating, by one or more processors, an alert indicating a suspected bot intrusion.

2. The method of claim 1, further comprising comparing the source address to a list of suspect servers.

3. The method of claim 1, further comprising comparing the destination address to a list of suspect servers.

4. The method of claim 1, further comprising storing the sequence of communications in a monitoring log.

5. The method of claim 1, wherein the firewall is between the source address and the destination address.

6. The method of claim 1, wherein determining that at least some communications occur at substantially fixed intervals includes detecting a repeating pattern of non-similar intervals between communications.

7. The method of claim 6, wherein the repeating pattern of non-similar intervals is a pattern of alternating time intervals.

8. The method of claim 6, wherein the repeating pattern of non-similar intervals is a pattern of incremental time intervals.

9. The method of claim 1, further comprising allowing a number of non-similar time intervals to occur before determining that at least some communications occur at substantially fixed intervals.

10. The method of claim 9, further comprising providing a user with the ability to set a maximum number of non-similar time intervals allowed to occur before determining that at least some communications occur at substantially fixed intervals.

11. The method of claim 9, wherein a maximum number of non-similar time intervals allowed to occur before determining that at least some communications occur at substantially fixed intervals is set based on at least one of the following: a volume of network traffic, available memory, and sophistication of a command-and-control server.

12. A computer program product for detecting malicious intrusions into a computer, the computer program product comprising:
one or more computer-readable tangible storage devices and program instructions stored on at least one of the one or more storage devices, the program instructions comprising:
program instructions to identify a sequence of communications between a common source address and a common destination address through a firewall for the computer, and respective times of the communications;
program instructions to determine that at least some of the communications occur at substantially fixed intervals, wherein the substantially fixed intervals are non-sequential intervals between non-sequential communications; and
program instructions to, based at least in part on the determination, generate an alert indicating a suspected bot intrusion.

13. The computer program product of claim 12, further comprising program instructions to compare the source address to a list of suspect servers.

14. The computer program product of claim 12, further comprising program instructions to compare the destination address to a list of suspect servers.

15. The computer program product of claim 12, further comprising program instructions to store the sequence of communications in a monitoring log.

16. The computer program product of claim 12, wherein the firewall is between the source address and the destination address.

17. A system for detecting malicious intrusions into a computer, the system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to identify a sequence of communications between a common source address and a common destination address through a firewall for the computer, and respective times of the communications;
program instructions to determine that at least some of the communications occur at substantially fixed intervals, wherein the substantially fixed intervals are non-sequential intervals between non-sequential communications; and
program instructions to, based at least in part on the determination, generate an alert indicating a suspected bot intrusion.

18. The system of claim 17, further comprising program instructions to compare the source address to a list of suspect servers.

19. The system of claim 17, further comprising program instructions to compare the destination address to a list of suspect servers.

20. The system of claim 17, further comprising program instructions to store the sequence of communications in a monitoring log.

* * * * *